United States Patent [19]
Sanu et al.

[11] Patent Number: 6,145,003
[45] Date of Patent: *Nov. 7, 2000

[54] METHOD OF WEB CRAWLING UTILIZING ADDRESS MAPPING

[75] Inventors: Sankrant Sanu, Redmond; Dmitriy Meyerzon, Bellevue, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,329

[22] Filed: Dec. 17, 1997

[51] Int. Cl.$^7$ .................................................. G06F 15/173
[52] U.S. Cl. ................................ 709/225; 709/203; 707/3
[58] Field of Search ..................................... 709/224, 218, 709/203, 250, 217, 225, 229, 236; 707/10, 3, 4, 103, 2, 104, 9, 5, 500, 501, 513, 522; 395/327

[56] References Cited

U.S. PATENT DOCUMENTS

| | | | |
|---|---|---|---|
| 5,649,186 | 7/1997 | Ferguson | 707/10 |
| 5,793,966 | 8/1998 | Amstein et al. | 709/203 |
| 5,848,410 | 12/1998 | Walls et al. | 707/4 |
| 5,855,020 | 12/1998 | Kirsch | 707/10 |
| 5,862,325 | 1/1999 | Reed et al. | 709/201 |
| 5,864,852 | 1/1999 | Luotonen | 707/10 |
| 5,870,546 | 2/1999 | Kirsch | 395/200.33 |
| 5,875,446 | 2/1999 | Brown et al. | 707/3 |
| 5,892,908 | 4/1999 | Hughes et al. | 395/200.8 |
| 5,895,470 | 4/1999 | Pirolli et al. | 707/102 |
| 5,903,892 | 5/1999 | Hoffert et al. | 707/10 |
| 5,933,822 | 8/1999 | Braden-Harder et al. | 707/5 |
| 5,974,455 | 10/1999 | Monier | 709/223 |
| 5,987,454 | 11/1999 | Hobbs | 707/4 |

OTHER PUBLICATIONS

Darren R. Hardy et al, "Harvest User's Manual," University of Colorado at Boulder, Technical Report CU–CS–743–94 Version 1.4 patch level 2, Jan. 31, 1996 pp 1–89.

*Primary Examiner*—Mehmet B. Geckil
*Attorney, Agent, or Firm*—Christenson O'Connor Johnson Kindness PLLC

[57] ABSTRACT

A computer-based system and method of retrieving information pertaining to Web documents on a computer network is disclosed. The method includes maintaining an address map that associates primary addresses with secondary addresses. A primary address includes a network retrieval protocol and a network address. The secondary address may include a different retrieval protocol or a different network address from the primary document address. A Web crawler retrieves a Web document using the primary document address, and determines whether the address map contains a secondary document address prefix corresponding to the primary document address prefix. If a secondary document address prefix exists, the Web crawler creates a secondary address, retrieves additional information pertaining to the Web document, and combines the additional information with the data retrieved from the Web document. The combined data may be stored in an index, and subsequently used to perform a document search.

28 Claims, 5 Drawing Sheets

METHOD OF WEB CRAWLING UTILIZING ADDRESS MAPPING

FIELD OF THE INVENTION

The present invention relates to the field of network information software and, in particular, to methods and systems for retrieving data from network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accept commands from a user and obtains data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that are store and distribute documents in one of a number of formats including the Hyper Text Markup Language (HTML). An HTML document contains text and metadata or commands providing formatting information. HTML documents also include embedded "links" that reference other data or documents located on any Web server computer. The referenced documents may represent text, graphics, audio, or video in respective formats.

A Web browser is a client application that communicates with server computers via FTP, HTTP, and Gopher protocols. Web browsers receive Web documents from the network and present them to a user. Internet Explorer, available from Microsoft Corporation, of Redmond, Wash., is an example of a popular Web browser application.

An intranet is a local area network containing Web servers and client computers operating in a manner similar to the World Wide Web described above. Typically, all of the computers on an intranet are contained within a company or organization.

Web crawlers are computer programs that automatically retrieve numerous Web documents from one or more Web sites. A Web crawler processes the received data, preparing the data to be subsequently processed by other programs. For example, a Web crawler may use the retrieved data to create an index of documents available over the Internet or an intranet. A "search engine" can later use the index to locate Web documents that satisfy a specified criteria.

Web crawlers use the same protocols as other programs, such as Web browsers and file system explorers, to access Web documents. The type of data that a Web crawler retrieves is determined by the protocol used. For example, the HTTP protocol does not provide a mechanism to obtain an access control list corresponding to a Web document. In another example, a Web document may have an associated second Web document at a different address, the second Web document containing information pertaining to the first Web document. HTTP does not provide an easy mechanism for obtaining related data from multiple sources and combining the data.

It is desirable to have a mechanism by which a Web crawler can increase the amount of information it obtains for each Web document. Preferably, such a mechanism will provide a Web crawler with a way to obtain information pertaining to a Web document by using more than one protocol. Additionally, a preferable mechanism will also provide a Web crawler with a way to obtain information pertaining to a Web document from a source other than the Web document itself. The present invention is directed to providing such a mechanism.

SUMMARY OF THE INVENTION

In accordance with this invention, a system and computer-based method of retrieving data from a computer network are provided. The method includes performing a Web crawl, by retrieving a Web document and subsequently retrieving additional Web documents based on addresses specified in hyperlinks within each Web document. For each Web document, an address map is checked to determine whether the document has a secondary document address corresponding to the first, or primary, document address. If a secondary document address exists, the secondary document address is used to retrieve data pertaining to the Web document.

In accordance with other aspects of this invention, a document address includes a protocol specification and a network address specification. The secondary document address may differ from the primary document address by having different specified protocols, different network addresses, or both. The secondary document address allows the retrieval of data not easily obtained using the first document address. The additional data may include data obtainable by using file system commands.

In accordance with still other aspects of this invention, after retrieving a Web document using a primary document address and additional data pertaining to the Web document using a secondary document address, the data obtained using the secondary document address is stored with the data obtained from the Web document. The combined data may be stored in a document index, which is subsequently used to locate the Web document. In accordance with yet still other aspects of this invention, an address map is maintained. The address map preferably includes a set of entries, each entry having a portion of a primary Web address and a corresponding portion of a secondary Web address.

As will be readily appreciated from the foregoing description, a system and method for retrieving data from Web documents on a computer network provide a way of retrieving and storing information pertaining to a Web document, wherein the information is not easily obtainable using a single retrieval protocol and network address. The invention allows a Web crawler to retrieve file system information, such as an access list, corresponding to a Web document, wherein the Web document is originally retrieved using a protocol that does not provide the file system information. The invention also allows data from two distinct Web documents to be combined, wherein a primary Web document has a corresponding secondary Web document containing information pertaining to the primary Web document.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a mechanism for obtaining information pertaining to Web documents that reside on one or more server computers. A server computer is referred to as a Web site, and the process of locating and retrieving digital data from Web sites is referred to as "Web crawling." The mechanism of the invention uses a table to associate Web address prefixes with a corresponding prefix that, if substituted in the original address, may yield another address with a different protocol, network site, or path. The crawler users the corresponding addresses or protocols to obtain information that supplements the data received by directly accessing the document using the documents primary address.

Figure 1:
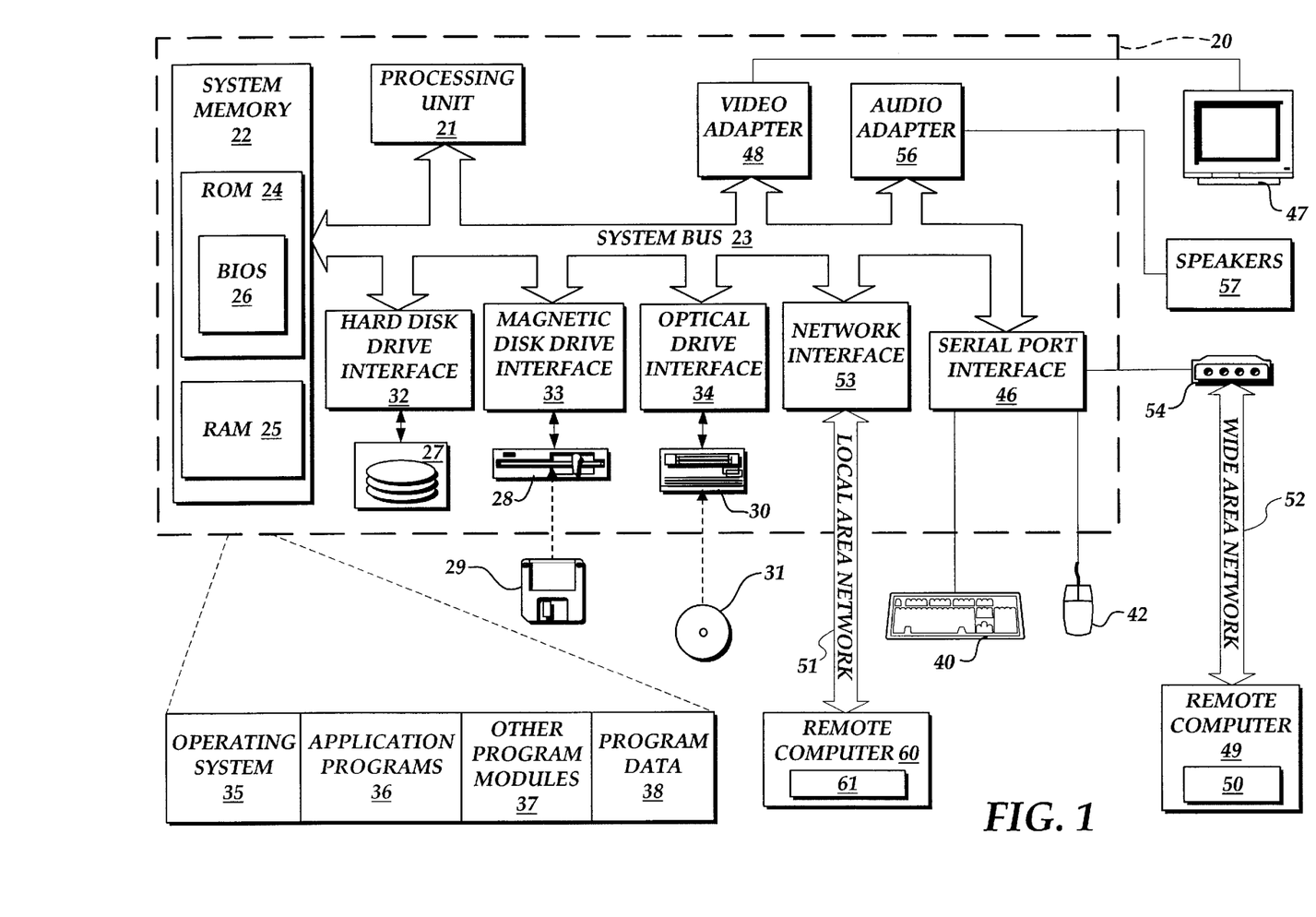
FIG. 1 is a block diagram of a general purpose computer system for implementing the present invention.

In accordance with the present invention, a Web crawler program executes on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
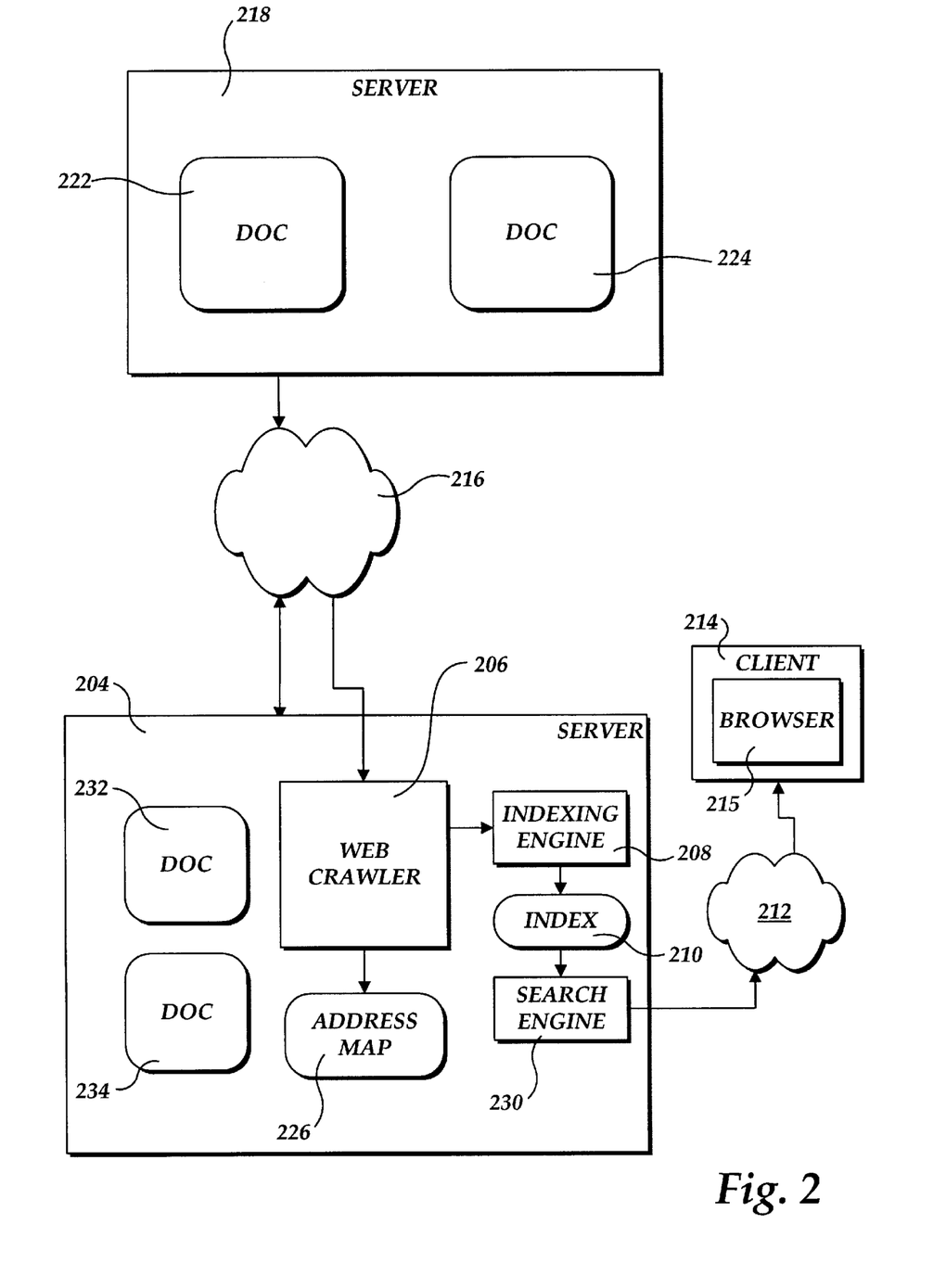
FIG. 2 is a block diagram illustrating a network architecture, in accordance with the present invention.

FIG. 2 illustrates an architecture of a networked system in which the present invention operates. A server computer 204 includes a Web crawler program 206 executing thereon. The Web crawler program 206 searches for Web documents distributed on one or more computers connected to a computer network 216, such as the remote server computer 218 depicted in FIG. 2. The computer network 216 may be a local area network 51 (FIG. 1), a wide area network 52, or a combination of networks that allow the server computer 204 to communicate with remote computers, such as the remote server computer 218, either directly or indirectly. The server computer 204 and the remote server computer 218 are preferably similar to the personal computer 20 depicted in FIG. 1 and discussed above.

The Web crawler program 206 searches remote server computers 218 connected to the network 216 for Web documents 222 and 224. The Web crawler 206 retrieves Web documents and associated data. The contents of the Web documents 222 and 224, along with the associated data, can be used in a variety of ways. For example, the Web crawler 206 may pass the information to an indexing engine 208. An indexing engine 208 is a computer program that maintains an index 210 of Web documents. The index 210 is similar to the index in a book, and contains reference information and pointers to corresponding Web documents to which the reference information applies. For example, the index may include keywords, and for each keyword a list of addresses. Each address can be used to locate a document that includes the keyword. The index may also include information other than keywords used within the Web documents. For example, the index 210 may include subject headings or category names, even when the literal subject heading or category name is not included within the Web document. The type of information stored in the index depends upon the complexity of the search engine, which may analyze the contents of the Web document and store the results of the analysis.

A client computer 214, such as the personal computer 20 (FIG. 1), is connected to the server computer 204 by a computer network 212. The computer network 212 may be a local area network, a wide area network, or a combination of networks. The computer network 212 may be the same network as the computer network 216 or a different network. The client computer 214 includes a computer program, such as a "browser" 215 that locates and displays documents to a user. When a user at the client computer 214 desires to search for one or more Web documents, the client computer transmits data to a search engine 230 requesting a search. At that time, the search engine 230 examines its associated index 210 to find documents that may be desired by the user. The search engine 230 may then return a list of documents to the browser 215 at the client computer 214. The user may then examine the list of documents and retrieve one or more desired Web documents from remote computers such as the remote server computer 218.

The Web crawler program 206 maintains an address map 226. The address map 226 is a simple database that contains a list of Web document address prefixes. For each Web document address prefix, referred to as a "primary" address prefix, the address map 226 contains a "secondary" address prefix corresponding to the primary address prefix. The Web crawler 206 uses the secondary address prefix to build a secondary address. The secondary address is used to retrieve information pertaining to a document, in order to augment or replace the information retrieved by using the primary address. This process is described in further detail below.

As will be readily understood by those skilled in the art of computer network systems, and others, the system illustrated in FIG. 2 is exemplary, and alternative configurations may also be used in accordance with the invention. For example, the server computer 204 itself may include Web documents 232 and 234 that are accessed by the Web crawler program 206. Also the Web crawler program 206, the indexing engine 208, and the search engine 230 may reside on different computers. Additionally, the Web browser program and the Web crawler program 206 may reside on a single computer. Further, the indexing engine 208 and search engine 230 are not required by the present invention. The Web crawler program 206 may retrieve Web document information for usages other than providing the information to a search engine. As discussed above, the client computer 214, the server computer 204, and the remote server computer 218 may communicate through any type of communication network or communications medium.

Figure 3:
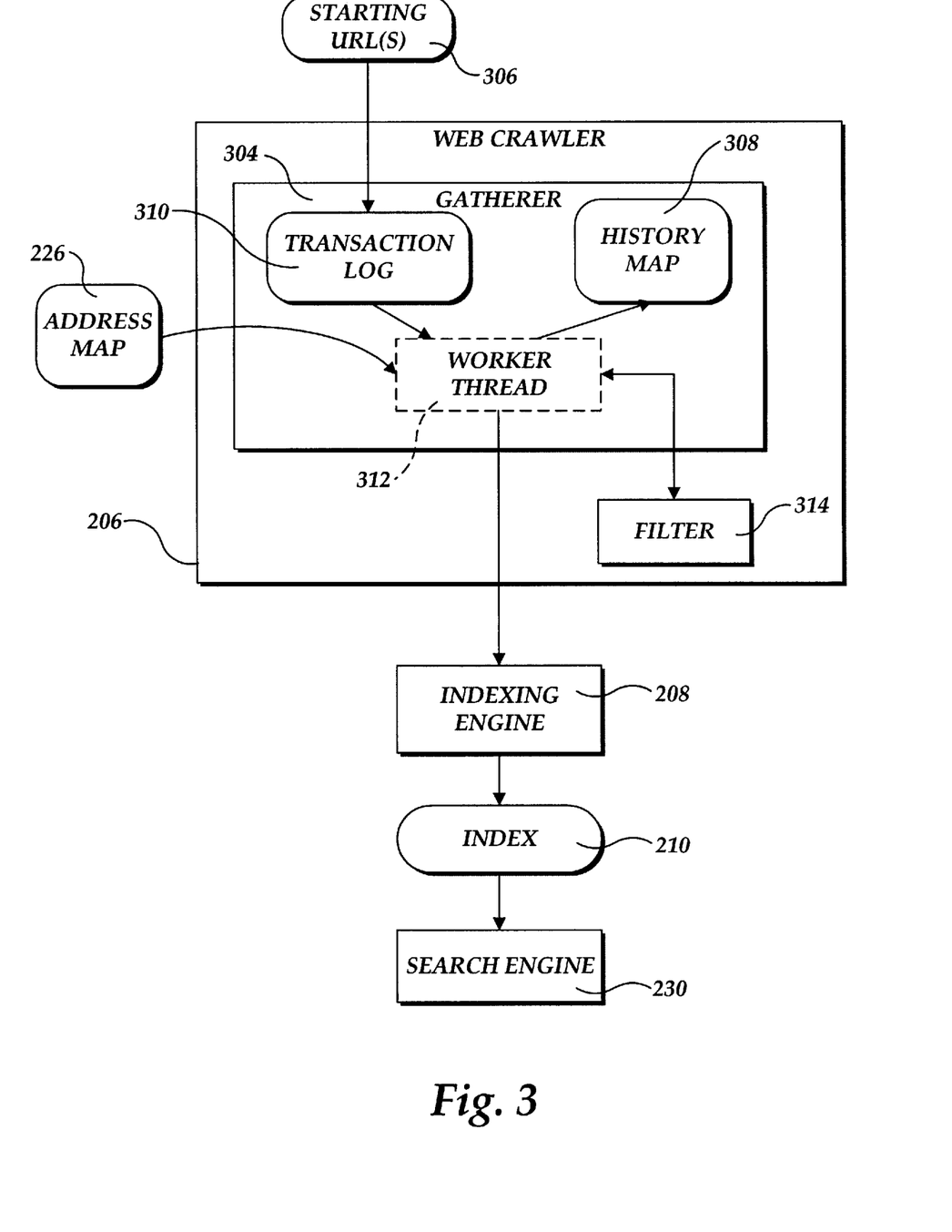
FIG. 3 is a block diagram illustrating a architecture of a Web crawler program, in accordance with the present invention.

FIG. 3 illustrates, in further detail, a Web crawler program 206 and related software executing on the server computer 204 (FIG. 2) that performs Web crawling and indexing of information in accordance with the present invention. As illustrated in FIG. 3, the Web crawler program 206 includes a "gatherer" process 304 that performs crawling of the Web and gathering of information pertaining to Web documents. The gatherer process 304 is invoked by passing it one or more starting URLs 306. The starting URLs 306 serve as seeds, instructing the gatherer process 304 where to begin its Web crawling process. A starting URL can be a universal naming convention (UNC) directory, a UNC path to a file, or an HTTP path to a file. A URL, or Web document address, comprises specifications of a protocol, a domain, and a path within the domain. The domain is also referred to as the host. In one actual embodiment of the invention, the protocol and domain specifications form an address prefix. As will be understood by those skilled in the art of computer programming, and others, the invention can be used with different address schemes.

The gatherer process 304 inserts the starting URLs 306 into a transaction log 310, which maintains a list of URLs that are currently being processed or have not yet been processed. The transaction log 310 functions as a queue. It is called a log because it is preferably implemented as a persistent queue that is written and kept on a disk to enable recovery after a system failure. Preferably, the transaction queue maintains a small in-memory cache for quick access to the next transactions.

The gatherer process 304 also maintains a history map 308, which contains an ongoing list of all URLs that have been searched during the current Web crawl. The gatherer process 304 includes one or more worker threads 312 that process each URL. The worker thread 312 retrieves a URL from the transaction log 310 and passes the URL to a filter daemon 314. The filter daemon 314 is a process that uses the URL to retrieve the Web document at the address specified by the URL. The filter daemon 314 uses the access method specified by the URL to retrieve the Web document. For example, if the access method is HTTP, the filter daemon 314 uses HTTP commands to retrieve the document. If the access method specified is FILE, the filter daemon uses file system commands to retrieve the corresponding documents.

The File Transfer Protocol (FTP) is another other well known access method that the filter daemon may use to retrieve a document. Other access protocols, such as database retrieval specifications, may also be used in conjunction with the invention.

After retrieving a Web document, the filter daemon parses the Web document and returns a list of text and properties. An HTML document includes a sequence of "tags," each tag containing some information. The information may be text that is to be displayed in the Web browser program 215 (FIG. 2). The information may also be "metadata" that describes the formatting of text. The information within tags may also contain hyperlinks to other Web documents. A hyperlink includes a specification of a Web address. If the tag containing a hyperlink is an image, the Web browser program 215 uses the hyperlink to retrieve the image and render it on the Web page. Similarly, the hyperlink may specify the address of audio data. If a hyperlink points to audio data, the Web browser program retrieves the audio data and plays it.

An "anchor" tag specifies a visual element and a hyperlink. The visual element may be text or a hyperlink to an image. When a user selects an anchor having an associated hyperlink in a Web browser program 215, the Web browser program automatically retrieves a Web document at the address specified in the hyperlink.

Tags may also contain information intended for a search engine. For example, a tag may include a subject or category within which the Web document falls, to assist search engines that perform searches by subject or category. The information contained in tags is referred to as "properties" of the Web document. A Web document is therefore considered to be made up of a set of properties and text. The filter daemon 314 returns the list of properties and text within a Web document to the worker thread 312.

As discussed above, a Web document may contain one or more hyperlinks. Therefore, the list of properties includes a list of URLs that are included in hyperlinks within the Web document. The worker thread 312 passes this list of URLs to the history map 308. The history map 308 checks each URL to determine if it is already listed within the history map. URLs that are not already listed are added to the history map and are also added to the transaction log 310, to be subsequently processed by a worker thread.

The worker thread 312 then passes the list of properties and text to the indexing engine 208. The indexing engine 208 creates an index 210, which is used by the search engine 230 in subsequent searches.

In accordance with the present invention, the Web crawler also maintains an address map 226 that contains a set of address prefix pairs. Each address prefix pair contains a primary address prefix, which forms a portion of a primary address, and a secondary address prefix. The secondary address prefix is substituted for the primary address prefix in a primary address to create a secondary address and obtain information pertaining to the Web document located at the primary address. In one actual implementation, the address map 226 is implemented as a hash table, and primary address prefixes are hashed to locate entries within the table.

Figure 5:
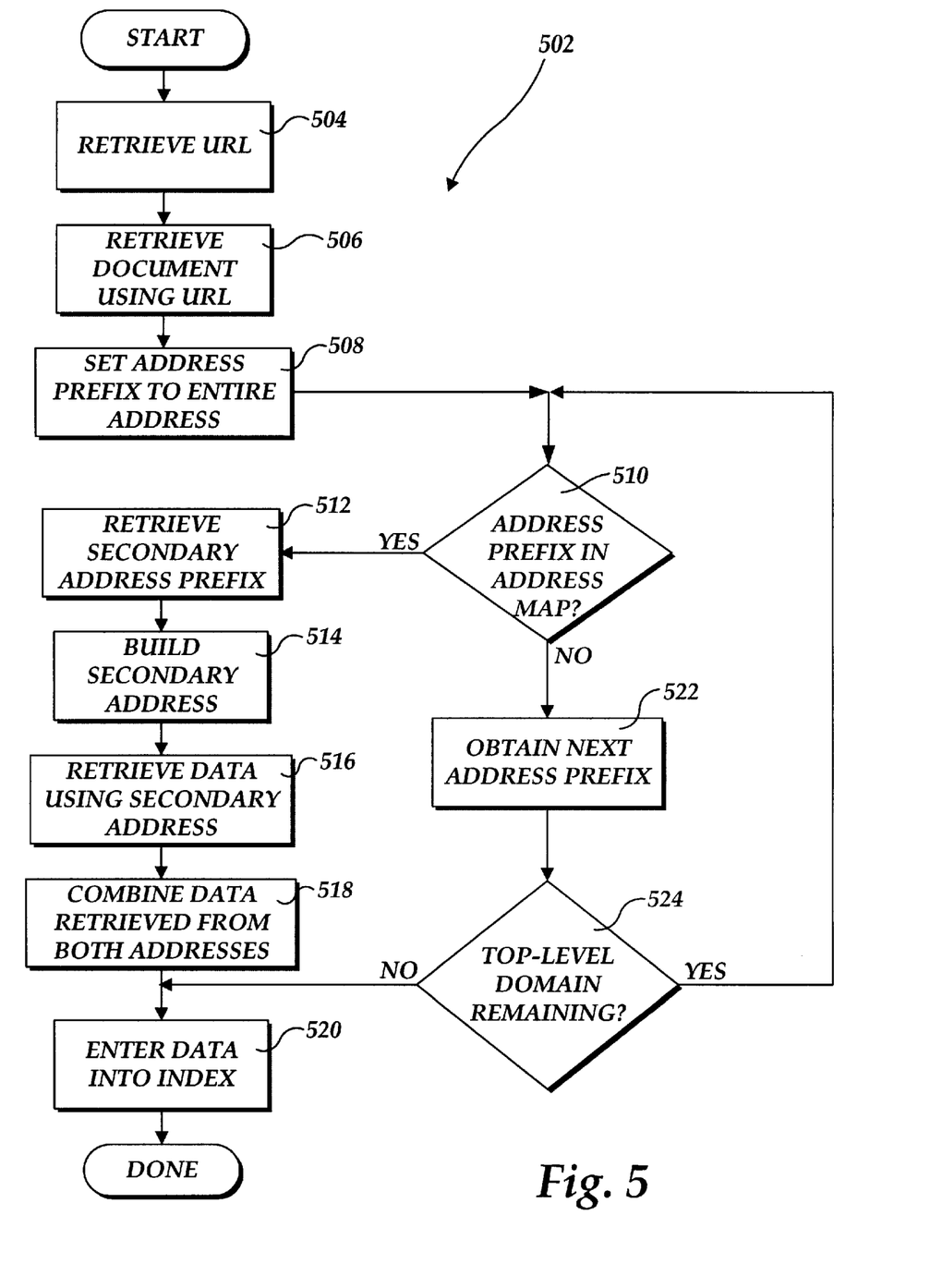
FIG. 5 is a flow diagram illustrating the process of retrieving information pertaining to a Web document.

During the processing of a primary address corresponding to a Web document, the Web crawler checks the address map 226 to determine if there is an associated secondary address prefix. If there is a secondary address prefix, the Web crawler retrieves data pertaining to the Web document by using a secondary address. The Web crawler may retrieve the Web document using the primary address, or it may limit the data retrieval to data obtained using the secondary address. The data obtained using the secondary address is passed to the indexing engine 208. The process of using an address map 226 is illustrated in FIG. 5 and discussed in further detail below.

Figure 4:
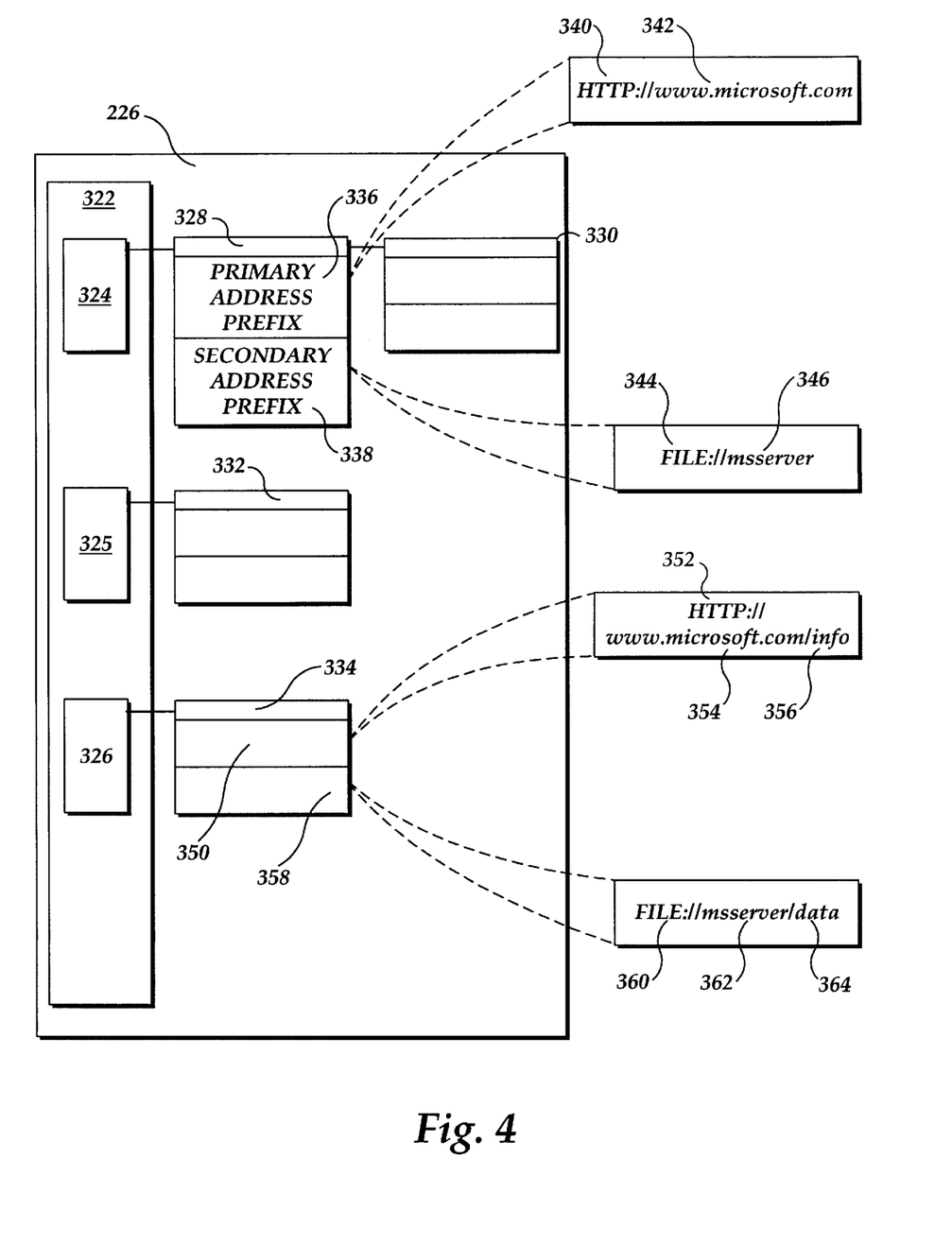
FIG. 4 illustrates a data structure used to map addresses, in accordance with the present invention.

FIG. 4 illustrates an exemplary address map 226. As illustrated in FIG. 4, the address map 226 includes a hash table 322. Each hash table entry 324 points to a list of address mappings 328, 330, 332, 334. The use of hash tables is well known in the art and is not discussed in detail herein, except as necessary to explain the invention.

An address mapping entry 328 contains a primary address prefix 336 and a secondary address prefix 338. The primary address prefix 336 comprises a protocol specification 340 and a top level domain specification 342. The secondary address prefix 338 also contains a protocol specification 344 and a top level domain specification 346. Using an address mapping entry 328, 330, 332, or 334, the worker thread 312 retrieves a primary address prefix from a URL, and finds a corresponding secondary address prefix 338 in the address map 320. The worker thread then creates a second, complete address by replacing the primary address prefix in the original URL with the secondary address prefix, as discussed below.

An address prefix can also include a directory specification. If a primary address prefix 336 includes a directory specification, the corresponding secondary address prefix includes a directory specification, which is used to create the secondary address. An address prefix may further include a file specification. In such a situation, the corresponding secondary address prefix specifies the entire secondary address. As depicted in FIG. 4, the address mapping 334 includes a primary address prefix 350 that comprises a protocol specification 352, a top level domain specification 354, and a directory specification 356. The correspondence secondary address specification 358 comprises a protocol specification 360, a top level domain specification 362, and a directory specification 364.

An address map 226 can be created and maintained in several ways. For example, a user can manually enter a list of primary address prefix and second address prefix pairings each time a new entry is desired. Alternatively, a user can write a computer program that generates address mappings between a FILE protocol and an HTTP protocol when the server 204 (FIG. 2) is a local server.

FIG. 5 illustrates an exemplary process 502 of retrieving and storing data using the address map of the present invention. At a step 504, the worker thread 312 (FIG. 3) retrieves a URL from the transaction log 310. At a step 506, the Web crawler retrieves a Web document using the protocol and address specified in the URL. In one actual embodiment, the worker thread 312 passes the URL to the filter daemon 314, which retrieves the Web document. This step is performed using the specified file retrieval protocol, such as HTTP, FTP, or FILE. The step 506 also includes retrieving the data from the Web document. The retrieval of data includes parsing the document, identifying each tag, and filtering out unnecessary tags and data. At a step 508, the worker thread 312 sets the first address prefix to be the entire address specified by the URL. As discussed above, the first address prefix therefore includes a protocol, a top level domain, an optional directory specification, and a file name. As URLs are typically formatted, the characters prior to the first colon specify the protocol. For example, in the URL http://www.microsoft.com/docs/page1.html "http" specifies the protocol. The top level domain is specified by the character string between "://" and the next single slash. In the above example, "www.microsoft.com" is the top level domain. The remainder of the URL specifies a directory path and a file name. In the above example, "docs/page1.html" specifies the path to a file named "page1.html."

At a step 510, a determination is made of whether the address prefix is in the address map 226 as a primary address prefix 336 (FIG. 4). If it is, at a step 512, the secondary address prefix 338 corresponding to the primary address prefix 336 is retrieved. At a step 514, a secondary address is built by combining the primary address with the secondary address prefix. When the primary address prefix is the entire primary address, the secondary address prefix becomes the secondary address. Although the invention as described utilizes address prefixes that may comprise a portion of an address, the mechanism of the invention may be applied to address mappings where each entry in the address map has a primary address and a corresponding secondary address.

A primary address can have a plurality of corresponding addresses that are used to obtain data. For example, an entry in the address map may include a primary address prefix, a secondary address prefix, and a tertiary address prefix. The number of addresses corresponding to a primary address may vary with each primary address. It should be readily apparent to one skilled in the art of computer programming, and others, that the process 502 of retrieving and storing data can be modified to accommodate multiple and varying numbers of addresses corresponding to a primary address.

After building a new URL, at a step 516, the worker thread 312 passes the secondary address to the filter daemon 314, which retrieves additional data using the secondary address. The secondary data may be a Web document or system level data pertaining to the document. For example, if the secondary address uses the protocol FILE, at step 516, the mechanism of the invention may retrieve such data as the time stamp of the last file update or an access control list. An access control list specifies the set of users that has security access to the file.

At step 518, the data retrieved at step 516 is combined with the data retrieved at step 506. At step 520, the combined data is used. For example, as illustrated in FIG. 3, the worker thread may pass the combined data to an indexing engine 208 for insertion into an index 210, to be subsequently used by a search engine 230.

If at the step 510 it is determined that the URL prefix does not exist in the address map as a primary address prefix, at a step 522, the worker thread 312 obtains the next address prefix by reducing the address prefix from the right side until a slash is found. At a step 524, a determination is made of whether a top level domain specification still remains in the new address prefix. If it does not, flow control proceeds to step 520, where the data retrieved at step 506 is entered into the index 210, without secondary data. If, at the step 524, a top level domain still remains in the new address prefix, flow control returns to the step 510, to search for the new address prefix in the address map.

After the address prefix is reduced to exclude the file specification, at the step 514, the retrieved secondary address prefix is combined with the directory and file specification "below" the address prefix to build a new secondary URL. For example, if the URL is "http://www.microsoft.com/docs/page1.html," the address prefix being searched at the step 510 is "http://www.microsoft.com," and the secondary address prefix corresponding to the primary address prefix is "file://msserver," the new secondary URL is "file://msserver/docs/page1.html." In the exemplary process 502 depicted in FIG. 5, the secondary address prefix corresponding to the longest address prefix of a URL is used if there are more than one primary address prefixes for a URL that have entries in the address map.

FIG. 5 illustrates a process 502 of obtaining information pertaining to a single address. As discussed above, a Web crawler repeats this process for many URLs, as it uses the links within each Web document to traverse a network of Web documents.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method of retrieving Web document information from a computer network, comprising:
   retrieving a Web document from a computer network using a first protocol included in a primary document address specification;
   obtaining data from the Web document;
   determining whether the primary document address specification has a corresponding secondary document address specification; and
   if the primary document address specification has a corresponding secondary document address specification, retrieving supplementary data from the computer network pertaining to the Web document using a second protocol included in the secondary document address specification.

2. The method of claim 1, wherein the primary document address specification includes the first protocol and a first network address, and the secondary document address specification includes the second protocol and a second network address, and wherein the first protocol is different from the second protocol.

3. The method of claim 2, wherein the first protocol is HTTP and the second protocol is FILE.

4. The method of claim 3, further comprising retrieving an access control list corresponding to the Web document by using the secondary document address specification.

5. The method of claim 4, further comprising storing the supplementary data pertaining to the Web document retrieved using the second protocol from the secondary document address specification with the data retrieved from the Web document using the first protocol from the primary document address specification in a document index.

6. The method of claim 1, wherein the primary document address specification includes the first protocol and a first network address, and the secondary document address specification includes the second protocol and a second network address, and the first network address is different from the second network address.

7. The method of claim 6, wherein retrieving supplementary data pertaining to the Web document by using the secondary document address specification comprises retrieving a second Web document that includes supplementary data pertaining to the Web document.

8. The method of claim 7, wherein retrieving the second Web document includes using the hypertext transfer protocol (HTTP) to retrieve the second Web document.

9. The method of claim 7, wherein retrieving the second Web document includes using a database specification to retrieve the second Web document.

10. The method of claim 1, wherein determining whether the primary document address specification has a corresponding secondary document address specification includes determining whether an entry corresponding to the primary document address specification exists in an address map.

11. The method of claim 10, wherein the entry corresponding to the primary document address specification includes a transfer protocol specification and a top level domain specification.

12. The method of claim 1, further comprising:

determining whether the primary document address specification has a corresponding tertiary document address specification;

if the primary document address specification has a corresponding tertiary document address specification, retrieving further data pertaining to the Web document by using the tertiary document specification; and if the primary document address specification has a corresponding tertiary document address specification, storing the further data pertaining to the Web document obtained using the tertiary document address specification with the data obtained from the Web document.

13. The method of claim 1, wherein the secondary document address specification is automatically built by replacing a secondary address prefix for a primary address prefix in the primary document address specification.

14. The method of claim 13, further comprising:

(a) obtaining a URL from a transaction log;

(b) parsing the URL into a URL prefix and URL suffix;

(c) providing an address map containing a plurality of primary address prefixes and corresponding secondary address prefixes;

(d) determining if the URL prefix is included in the address map as a primary address prefix;

(i) if the URL prefix is included in the address map as a primary address prefix, combining a secondary address prefix that corresponds to the primary address prefix with the URL suffix to build the secondary document address specification; and (ii) if the URL prefix is not included in the address map as a primary address prefix, changing the parsing of the URL to incrementally reduce the URL prefix and increase the URL suffix and then repeating this paragraph (d).

15. A computer-based method of retrieving information from a computer network during a network crawl, comprising:

retrieving an electronic document from the computer network, the electronic document including at least one hyperlink specification including a primary document address specification;

retrieving at least one primary document address specification from the electronic document using a first protocol included in the primary address specification, each primary document address corresponding to a linked electronic document;

determining whether the primary document address specification has a corresponding secondary document address specification;

if the primary document address specification has a corresponding secondary document address specification, retrieving supplementary data pertaining to the linked electronic document from the computer network using a second protocol included in the secondary document address specification; and if the primary document address specification has a corresponding secondary document address specification, storing the supplementary data pertaining to the linked electronic document obtained using the secondary document address specification and associating the stored supplementary data pertaining to the linked electronic document with the primary document address specification.

16. The method of claim 15, wherein the primary document address specification includes the first protocol and a first network address, and the secondary document address specification includes the second protocol and a second network address, and wherein the first protocol is different from the second protocol.

17. The method of claim 15, wherein the primary document address specification includes the first protocol and a first network address, and the secondary document address specification includes the second protocol and a second network address, and the first network address is different from the second network address.

18. The method of claim 15, wherein determining whether the primary document address specification has a corresponding secondary document address specification includes determining whether an entry corresponding to the primary document address specification exists in an address map.

19. The method of claim 15, further comprising:

retrieving data from the linked electronic document using the primary document address specification;

storing the data retrieved from the linked electronic document using the primary document address specification; and associating the data retrieved from the linked electronic document using the primary document address specification with the supplementary data pertaining to the linked electronic document retrieved using the secondary document address specification.

20. The method of claim 15, further comprising:

automatically retrieving a plurality of primary document address specifications from a plurality of hyperlinks included in the electronic document;

automatically retrieving a plurality of secondary document address specifications corresponding to said plurality of primary document address specifications; and automatically retrieving supplementary data pertaining to the linked electronic document using said plurality of secondary document address specifications.

21. The method of claim 15, wherein the secondary address specification is automatically built by replacing a secondary address prefix for a primary address prefix in the primary document address specification.

22. The method of claim 21, further comprising:

(a) obtaining a URL from a transaction log;

(b) parsing the URL into a URL prefix and URL suffix;

(c) providing an address map containing a plurality of primary address prefixes and corresponding secondary address prefixes;

(d) determining if the URL prefix is included in the address map as a primary address prefix;

(i) if the URL prefix is included in the address map as a primary address prefix, combining a secondary address prefix that corresponds to the primary address prefix with the URL suffix to build the secondary address specification; and (ii) if the URL prefix is not included in the address map as a primary address prefix, changing the parsing of the URL to incrementally reduce the URL prefix and increase the URL suffix and then repeating this paragraph (d).

23. A system for performing a Web crawl, the system comprising:

a server computer having a Web crawler program executing thereon;

an address map accessible to the Web crawler program and containing a plurality of primary Web addresses and a plurality of secondary Web addresses, each primary Web address having a corresponding secondary Web address;

the primary Web address including a first protocol for the retrieval of a Web document at the primary Web address;

the secondary Web address including a second protocol for the retrieval of a Web document at the secondary Web address;

the second protocol for the retrieval of a Web document at the secondary Web address being different than the first protocol for the retrieval of a Web document at the primary Web address;

a computer network including at least one Web server having a plurality of Web documents stored thereon, each Web document having a corresponding primary Web address;

a database containing information pertaining to the plurality of Web documents;

program code for:

retrieving a primary Web address corresponding to one of the Web documents;

determining whether the primary Web address has a corresponding secondary Web address;

selectively retrieving supplementary information pertaining to said one of the Web documents using the corresponding secondary Web address; and if the supplementary information pertaining to said one of the Web documents is retrieved using the secondary Web address, storing said supplementary information in the database.

24. The system of claim 23, further comprising a search engine that performs a Web search using the database.

25. The system of claim 24, wherein the first protocol is HTTP, the second protocol is FILE, and the retrieving of supplementary information pertaining to said one of the Web documents using the secondary Web address includes using file system commands to retrieve the supplementary information pertaining to said one of the Web documents.

26. The system of claim 25, wherein the supplementary information pertaining to said one of the Web documents includes an access control list.

27. The system of claim 23, wherein each primary Web address includes a data transfer protocol specification and a top level domain specification, and each secondary Web address includes a data transfer protocol specification and a top level domain specification.

28. The system of claim 23, wherein the address map and said plurality of Web documents reside on different computers.

* * * * *

UNITED STATES PATENT AND TRADEMARK OFFICE
CERTIFICATE OF CORRECTION

PATENT NO. : 6,145,003
DATED : November 7, 2000
INVENTOR(S) : S. Sanu et al.

It is certified that error appears in the above-identified patent and that said Letters Patent is hereby corrected as shown below:

Title page,
Attorney, Agent or Firm, "Christenson" should read -- Christensen --

Column 1,
Line 32, "that are store" should read -- that store --

Column 3,
Line 28, "users" should read -- uses --
Line 30, "documents" should read -- document's --
Line 67, "helps" should read -- help --

Column 4,
Line 22, "(ROM)," should read -- (ROMs), --

Column 6,
Line 13, "Also" should read -- Also, --

Signed and Sealed this

Eighteenth Day of December, 2001

Attest:

Attesting Officer

JAMES E. ROGAN
Director of the United States Patent and Trademark Office